United States Patent
Terada et al.

(10) Patent No.: US 8,324,501 B2
(45) Date of Patent: Dec. 4, 2012

(54) ARM STRUCTURE

(75) Inventors: Tomoyasu Terada, Kosai (JP); Tsukasa Sekino, Kosai (JP); Mitsunobu Katou, Kosai (JP); Hiroshi Yamashita, Kosai (JP); Daisuke Okamoto, Kosai (JP); Tomoaki Nishimura, Kariya (JP); Motonari Inagaki, Aichi-ken (JP)

(73) Assignees: Yazaki Corporation, Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 293 days.

(21) Appl. No.: 12/878,425

(22) Filed: Sep. 9, 2010

(65) Prior Publication Data

US 2011/0061895 A1    Mar. 17, 2011

(30) Foreign Application Priority Data

Sep. 11, 2009  (JP) .................. 2009-210583

(51) Int. Cl.
  *H01B 7/00* (2006.01)
  *H02G 3/04* (2006.01)
  *B60J 5/06* (2006.01)
(52) U.S. Cl. ...................... 174/72 A; 296/155
(58) Field of Classification Search .............. None
See application file for complete search history.

(56) References Cited

U.S. PATENT DOCUMENTS

| | | | | |
|---|---|---|---|---|
| 3,925,595 A * | 12/1975 | Hawkins | ........................ | 174/42 |
| 3,965,286 A * | 6/1976 | Smart | ............................ | 174/42 |
| 4,012,581 A * | 3/1977 | Hawkins | ........................ | 174/42 |
| 4,565,038 A * | 1/1986 | Milbright et al. | ............... | 52/146 |
| 6,194,664 B1 * | 2/2001 | Zamora et al. | ............. | 174/117 F |
| 6,330,734 B1 * | 12/2001 | Cho | .................. | 16/376 |
| 6,682,353 B2 * | 1/2004 | Bigotto | ............... | 439/34 |
| 7,422,268 B2 * | 9/2008 | Kothe et al. | .................. | 296/155 |
| 7,530,825 B2 * | 5/2009 | Sato et al. | ..................... | 439/162 |
| 7,557,297 B2 * | 7/2009 | Axland et al. | ................. | 174/53 |
| 7,765,740 B2 * | 8/2010 | Heuel et al. | ..................... | 49/360 |
| 2001/0040045 A1 * | 11/2001 | Shak | .............................. | 174/135 |
| 2003/0116342 A1 * | 6/2003 | Zhang | ........................ | 174/74 R |
| 2004/0238199 A1 * | 12/2004 | Yamanaka et al. | .......... | 174/68.1 |
| 2006/0202507 A1 * | 9/2006 | Miyagawa et al. | ......... | 296/155 |
| 2007/0096504 A1 * | 5/2007 | Kothe et al. | ................... | 296/155 |
| 2008/0035799 A1 * | 2/2008 | Yamamoto et al. | ............ | 248/49 |
| 2008/0035800 A1 * | 2/2008 | Yamamoto | ..................... | 248/70 |
| 2008/0142260 A1 * | 6/2008 | Yamaguchi | ................. | 174/72 A |

(Continued)

FOREIGN PATENT DOCUMENTS

JP    2009-065814 A    3/2009

*Primary Examiner* — Lisa Lea Edmonds
*Assistant Examiner* — Xanthia C Cunningham
(74) *Attorney, Agent, or Firm* — Sughrue Mion, PLLC

(57) ABSTRACT

An arm structure includes a first arm pivotally supported on a body, and a second arm pivotally supported on the first arm at an axis portion formed on a distal end side of the first arm. A wire harness fixing portion for fixing a wire harness is provided at a distal end side of the second arm. A guide portion having a curved face for guiding the wire harness is provided at an end portion at an end side of the second arm, the end side being opposite to the distal end side. A width of the guide portion is larger than a width of a portion of the second arm corresponding to the axis portion, in a width direction perpendicular to a longitudinal direction of the second arm.

6 Claims, 3 Drawing Sheets

U.S. PATENT DOCUMENTS

| | | | |
|---|---|---|---|
| 2008/0210828 A1* | 9/2008 | Kogure et al. | 248/65 |
| 2009/0090539 A1* | 4/2009 | Iwahara | 174/135 |
| 2009/0095858 A1* | 4/2009 | Katou et al. | 248/205.1 |
| 2009/0212592 A1* | 8/2009 | Takahashi | 296/155 |
| 2009/0230724 A1* | 9/2009 | Fischer et al. | 296/155 |

\* cited by examiner

ARM STRUCTURE

BACKGROUND

The present invention relates to an arm structure for bending and cabling a wire harness for power feeding along a second arm pivotally supported to a first arm of a turn type.

FIG. 6 shows one example of a related arm structure for power feeding.

In this structure, a first long arm 62 is pivotally supported to a protector base 61 made of synthetic resin, a second short arm 63 is pivotally supported to the first arm 62, and a wire harness fixing portion 64 is disposed integrally to the second arm 63, a wire harness 65 is fixed to the wire harness fixing portion 64 and while each of the arms 62, 63 is turned along the protector base 61 with swing of forward and backward directions of the wire harness 65, and the second arm 63 is turned at an angle larger than that of the first arm 62 and flexibility in bending of the wire harness 65 is increased.

The first arm 62 is urged upward by a torsion spring (not shown) and absorbs looseness of the wire harness 65. A protector cover 66 made of synthetic resin is attached to the protector base 61, and a protector 67 is constructed of the protector base 61 and the protector cover 66. A power feeding apparatus 68 is constructed of the protector 67, each of the arms 62, 63, etc. The protector 67 is screwed and fixed to a slide door (not shown) of an automobile.

At the time of opening (during opening) of the slide door, the second arm 63 turns forward larger than the first arm 62 while each of the arms 62, 63 turns forward as shown by a solid line of FIG. 6, and at the time of closing (during closing) of the slide door, each of the arms 62, 63 turns backward at substantially the same angle as shown by a chain line of FIG. 6.

One end of the wire harness 65 bends along an end portion of the side of an axis portion 69 of the second arm 63 from the wire harness fixing portion 64 and also traverses the first arm 62 and is led out inside the slide door through a wire harness insertion path (wire harness fixing portion) 70 of a protector front end, and the other end of the wire harness 65 is cabled from the wire harness fixing portion 64 to the side of a vehicle body and swings forward and backward along a skirt part (a lower opening) 71 of the protector 67 with opening and closing of the slide door.

As a protector structure (not shown) for arm structure for power feeding other than the above example, a situation in which a link arm (first arm) and a wire harness holder having the second arm pivotally supported to the distal end side of the link arm are turned and a corrugate tube of the wire harness is fixed to the wire harness holder and an electric wire portion of the wire harness led out of the corrugate tube is bent in substantially an S shape through the back side of the link arm and is led out of the protector front end to the outside and the link arm is urged upward by the torsion spring is described in, for example, JP-A-2009-65814 (FIG. 1).

However, the related arm structure for power feeding had fears that when the wire harness 65 bends in a small radius along an end (proximal end) of the side of the axis portion 69 of the second arm 63 (bent parts are shown by numerals 65a, 65b) particularly during opening of the slide door of the solid line or at the time of closing of the slide door of the chain line as shown in FIG. 6, strong bending stress acts on the wire harness 65 and bending durability of the wire harness 65 reduces or operability of opening and closing of the slide door reduces.

These fears may be caused similarly in the case of applying the arm structure for power feeding to a slide structural body such as the slide door of an apparatus etc. other than the vehicle or the slide door of the vehicle other than the automobile. The vehicle body etc. is collectively called as a fixed structural body with respect to the slide structural body.

SUMMARY

It is therefore an object of the present invention to provide an arm structure capable of increasing operability of opening and closing of a slide structural body or bending durability of a wire harness by preventing the wire harness from bending in a small radius along a proximal end of a second arm supported to a first arm.

In order to achieve the above object, according to the present invention, there is provided an arm structure comprising a first arm pivotally supported on a body; and a second arm pivotally supported on the first arm at an axis portion formed on a distal end side of the first arm, wherein a wire harness fixing portion for fixing a wire harness is provided at a distal end side of the second arm;

wherein a guide portion having a curved face for guiding the wire harness is provided at an end portion at an end side of the second arm, the end side being opposite to the distal end side; and wherein a width of the guide portion is larger than a width of a portion of the second arm corresponding to the axis portion, in a width direction perpendicular to a longitudinal direction of the second arm.

Preferably, the guide portion is a proximal end portion extended from the portion of the second arm corresponding to the axis portion in the longitudinal direction of the second arm.

Preferably, the guide portion is comprised of an elastic member.

Preferably, the second arm is formed in a tapered shape so that a width of the second arm becomes gradually small from the axis portion side to the distal end side of the second arm, and the guide portion is provided at extended lines from both side face of the second arm which form the tapered shape.

Preferably, the guide portion is comprised of a spring member having a plate shape.

Preferably, the spring member has a straight part and a curved part extended from the straight part, a curvature radius of the curved part is larger than that of the end portion at an end side of the second arm.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
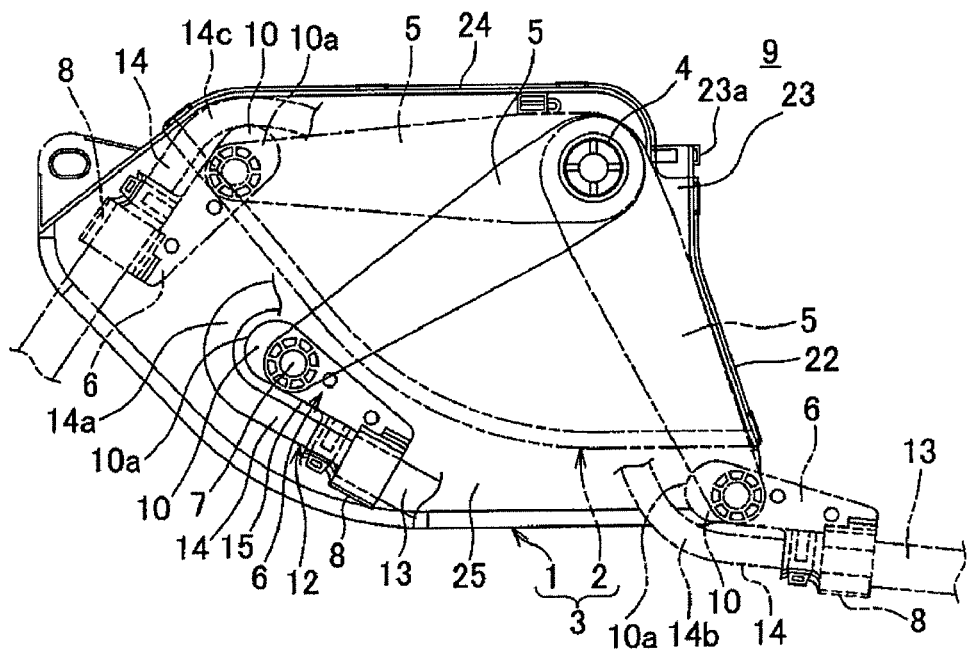
FIG. 1 is a front view showing a first embodiment of an arm structure for power feeding according to the invention.
Figure 2:
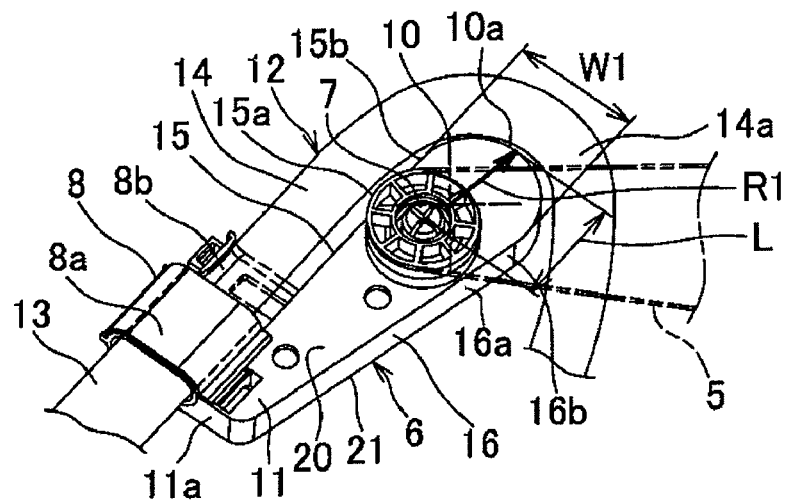
FIG. 2 is a perspective view showing a main part of the same arm structure for power feeding.

FIGS. 1 and 2 show a first embodiment of an arm structure for power feeding according to the invention.

In a power feeding apparatus 9 including a protector 3 constructed of a protector cover 2 and a protector base 1 made of synthetic resin, a first long arm 5 pivotally supported to the protector base 1 by a first axis portion 4, a second short arm 6 pivotally supported to a distal end of the first arm 5 by a second axis portion 7, and a wire harness fixing portion 8 disposed integrally to the second arm 6 as shown in FIG. 1. This structure is constructed so that an end (proximal end 10) of the side of the axis portion 7 of the second arm 6 is extended in a direction opposite to a distal end 11 of the second arm 6 and a distance L from the second axis portion 7 to the proximal end 10 is set long and a radius R1 of a curved outer peripheral surface 10a of the proximal end 10 is set large and a wire harness 12 is bent in a large radius along the outer peripheral surface 10a (a bent part is shown by numeral 14a) as shown in FIG. 2.

As shown in FIG. 1, the first arm 5 is preferably formed in a convergent tapered shape straight by a synthetic resin material, and the second arm 6 is formed in a convergent tapered shape straight by a synthetic resin material so as to have a width and a length less than or equal to about one-half the first arm 5.

As shown in FIG. 2, the second axis portion 7 is arranged in a position of a length less than or equal to about one-third the whole length of the second arm 6 from a proximal end (substitution of numeral 10a) of the second arm 6. Both tapered side surfaces 15, 16 along a longitudinal direction of the second arm 6 are widened gradually from a top 11a toward the proximal end 10a, so that a width W1 of the curved surface (guide surface) 10a of the proximal end (guide portion) 10 with substantially a fan shape of the second arm 6 subsequent to both tapered side surfaces 15, 16 is formed larger than a width of both side surfaces 15a, 16a in both sides of the axis portion 7 and spaced from the center of the second axis portion 7 in the large radius R1, that is, a width W2 of a proximal end 18 in an example of a second arm 17 which does not extend the proximal end 18 of FIG. 3.

The virtual center of the curved surface 10a of the proximal end 10 of FIG. 2 is in a position in which the center of the axis portion 7 is moved in the longitudinal direction of the second arm 6. The radius R1 of the curved surface 10a is larger than a radius R2 of a curved surface of the proximal end 18 of FIG. 3. The curved surface 10a of FIG. 2 continues across both tapered side surfaces 15, 16 smoothly in a circular arc shorter than a semicircle.

In addition, when the radius R1 of the curved surface 10a of the proximal end 10 is set larger, in FIG. 2, a side surface (side surface opposite to a side surface of the wire harness fixing portion 8) 16b of the proximal end 10 can also be widened outward or both side surfaces 15b, 16b of the proximal end 10 can be widened outward in an outer direction to continue the widened side surfaces 15b, 16b of the proximal end 10 to the side surfaces 15a, 16a of the second arm 6 at step surfaces (not shown) of a curved shape etc. This configuration is also effective in the case where the second arm 6 has a straight shape (direct shape) rather than the tapered shape.

The second arm 6 shown in FIG. 2 includes a flat substrate part 20 and a rib (peripheral wall) 21 orthogonal to an outer peripheral end of the substrate part 20, and the substrate part 20 is formed in a convergent tapered shape, and an outer surface of the rib 21 forms at least both side surfaces 15, 16 and the curved surface 10a, and the inside of the rib 21 forms space for receiving a distal end side of the second axis portion 7. The distal end of the first arm 5 overlaps slidably with a surface of the substrate part 20, and the head of the axis portion 7 is substantially flush with a surface of the first arm 5.

The wire harness fixing portion 8 is integrally provided to one side surface 15 of a distal end 11 of the second arm 6. The wire harness fixing portion 8 of the present embodiment includes a corrugate tube holding part 8a with an oval cross section (a flat shape) having a long radius part in a width direction of the second arm 6, and an electric wire support part 8b extending in a direction of the axis portion 7 from the holding part 8a.

The corrugate tube holding part 8a can be opened and closed, and by inserting a corrugate tube 13 with an oval cross section made of synthetic resin in an opened state and closing the corrugate tube 13, a rib of an inner surface of the holding part 8a is engaged with a peripheral groove (not shown) of the corrugate tube 13 and the corrugate tube 13 is fixed. The electric wire support part 8b supports an electric wire portion 14 led out of (exposed from) an end of the corrugate tube 13. The wire harness 12 is constructed of the corrugate tube 13 and the electric wire portion 14.

Figure 3:
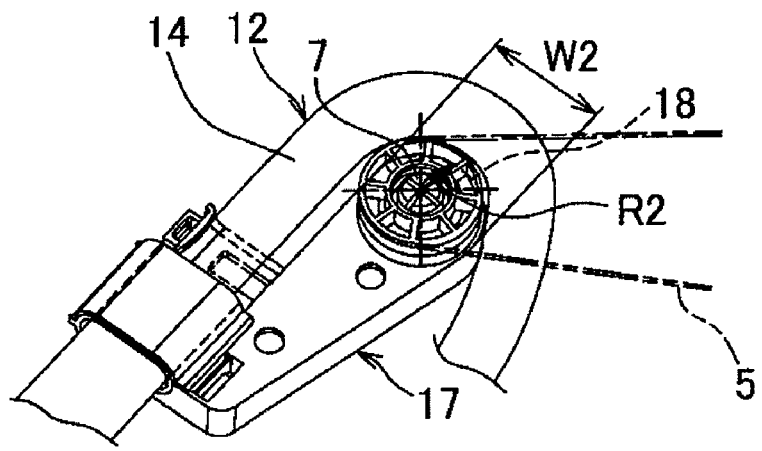
FIG. 3 is a perspective view showing an arm structure for power feeding without having a feature of the invention as reference.

As shown in FIG. 2, the electric wire portion 14 of the wire harness 12 bends in a large radius in a folded-back direction along the large-radius curved surface 10a of the proximal end 10 of the second arm 6 (a size of the radius or the curved surface 10a is compared with the example of FIG. 3). Consequently, as compared with the case (FIG. 3) where the proximal end 10 of the second arm 6 is not extended, bending stress of the electric wire portion 14 of the wire harness 12 is reduced and bending durability of the electric wire portion 14 improves. Also, the electric wire portion 14 is bent by a small force, so that a force of operating opening and closing of a slide door (not shown) is reduced and operability of opening and closing improves.

As shown in FIG. 1, the protector 3 is fixed (in a portrait state) vertically to a door inner panel of the slide door (not shown) and at the time of fully opening the slide door (slide structural body), the first arm 5 turns forward using the axis portion 4 as a fulcrum as shown by a chain line and is positioned obliquely forward and downward along an inclined front end wall 22 of the protector 3, and the second arm 6 turns forward larger than the first arm 5 and is positioned forward and downward slightly from the horizon, and the wire harness fixing portion 8 is positioned in the lower side of the second arm 6.

The corrugate tube portion 13 of the wire harness 12 is cabled substantially horizontally toward a wire harness fixing portion (not shown) of a vehicle body (a fixed structural body), and the electric wire portion 14 of the wire harness 12 extends straight along the lower surface (one side surface) 15 of the second arm 6 from the wire harness fixing portion 8 and bends smoothly in the large radius along the large-radius curved surface 10a of the proximal end 10 of the second arm 6 (a bent part is shown by numeral 14b) and also is inclined backward and upward and continues to a wire harness insertion path 23 (a wire harness fixing portion 23a of the upper side) of a front end of the protector 3 through the back surface side of the first arm 5. The wire harness fixing portion 23a of the protector 3 is a member for inserting a band (not shown) and bonding and fixing the electric wire portion 14.

As the slide door is closed forward, the first arm 5 clockwise turns backward using the axis portion 4 as the fulcrum as shown by a solid line in a half opened state of the slide door and is positioned obliquely backward and downward in the vicinity of substantially the center of the protector 3, and the second arm 6 clockwise turns backward slightly from the time of full opening using the axis portion 7 as a fulcrum and is positioned obliquely forward and downward, and the wire harness fixing portion 8 is positioned obliquely forward and downward in the top lower side of the second arm 6.

The electric wire portion 14 of the wire harness 12 extends straight along the lower surface (one side surface) 15 of the second arm 6 from the wire harness fixing portion 8 and bends smoothly in the large radius along the large-radius curved surface 10a of the proximal end 10 of the second arm 6 (the bent part is shown by numeral 14a) and is folded back forward and continues to the wire harness insertion path 23 of the protector front end across the back surface of the first arm 5. This state corresponds to a bend form of the wire harness of FIG. 2 generally.

At the time of fully closing the slide door, the first arm 5 is positioned substantially horizontally along an upper end wall 24 of the protector 3 as shown by the chain line, and the second arm 6 is positioned obliquely backward and downward, and the wire harness fixing portion 8 is positioned obliquely backward and downward in the top upper side of the second arm 6.

The electric wire portion 14 of the wire harness 12 extends straight along the upper side surface (one side surface) 15 of the second arm 6 from the wire harness fixing portion 8 and bends smoothly in the large radius along the large-radius curved surface 10a of the proximal end 10 of the second arm 6 (a bent part is shown by numeral 14c) and also is inclined forward and downward and continues to the wire harness insertion path 23 of the protector front end through the back surface of the first arm 5.

Action of each of the arms 5, 6 in the case of backward opening the slide door from the fully closed state only becomes opposite to action from the opened state to the closed state, and a bend form of the electric wire portion 14 of the wire harness 12 along the proximal end 10 of the second arm 6 is similar to the above.

When a slide stroke of the slide door is small according to a vehicle model etc., a swing angle, that is, a turning angle of the first arm 5 becomes small in FIG. 1 and when the slide stroke of the slide door is large, the swing angle of the first arm 5 becomes large and in both cases, an operation of bending of the wire harness 12 along the proximal end 10 of the second arm 6 or turning of the second arm 6 is performed in a manner similar to that in FIG. 1, so that the low-cost arm structure for power feeding or the power feeding apparatus 9 can be provided by sharing each of these arms 5, 6, etc. This similarly applies to a second embodiment described below.

The protector 3 of the present embodiment includes the protector cover 2 with a skirt shorter than the protector base 1, and the protector base 1 and the protector cover 2 respectively include right and left vertical opposed substrate parts 25 and peripheral walls including the upper end wall 24 and the front end wall 22, and are mutually locked by locking members. The second arm 6 and the wire harness fixing portion 8 are exposed from the protector cover 2.

The first arm 5 is urged upward (in a direction of absorbing looseness of the wire harness) by a spring member (not shown) such as a torsion spring made of metal. The spring member is eliminated and, for example, the wire harness 12 can also be led in the protector 3 by only rigidity (restoring force) of the corrugate tube 13. A form of the protector 3 can be set properly.

In addition, in the first embodiment, the second arm 6 is formed in the convergent tapered shape, but when the second arm 6 is straight (both side surfaces 15, 16 are parallel), the proximal end (guide portion) 10 of the second arm 6 can also be formed in substantially a circular shape or substantially a semicircular shape with a radius larger than a plate width of the second arm 6 as described above. Also, the proximal end (guide portion) 10 can be formed separately from the second arm 6 to be fastened to the second arm 6 by a process of adhesion, locking, etc.

Figure 4:
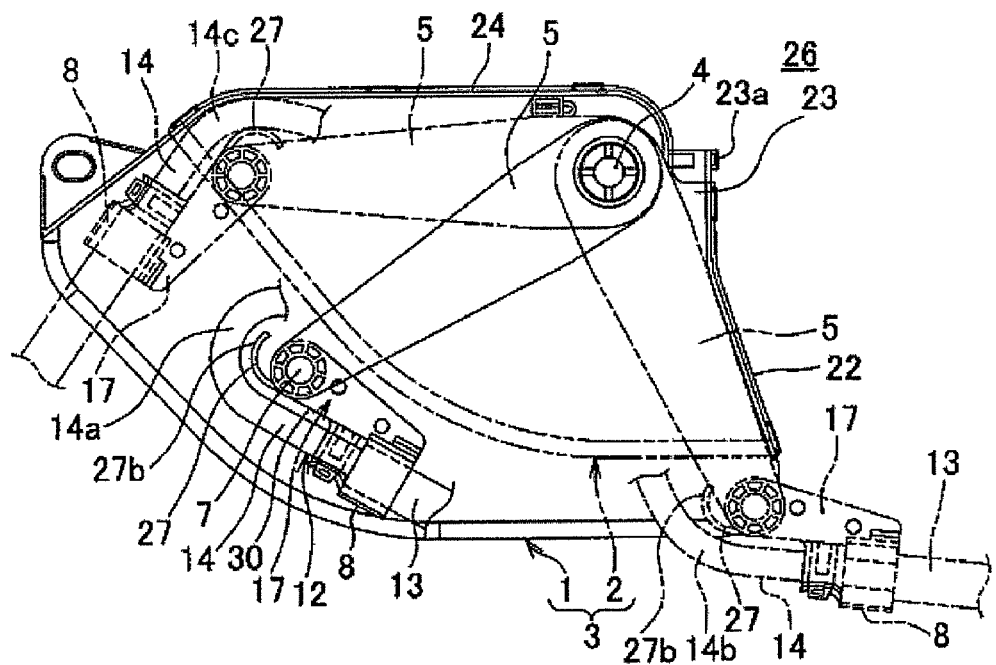
FIG. 4 is a front view showing a second embodiment of an arm structure for power feeding according to the invention.
Figure 5:
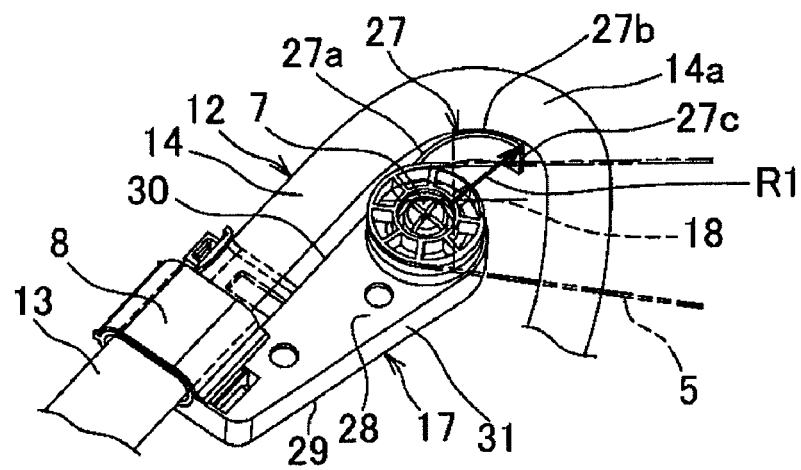
FIG. 5 is a perspective view showing a main part of the same arm structure for power feeding.
Figure 6:
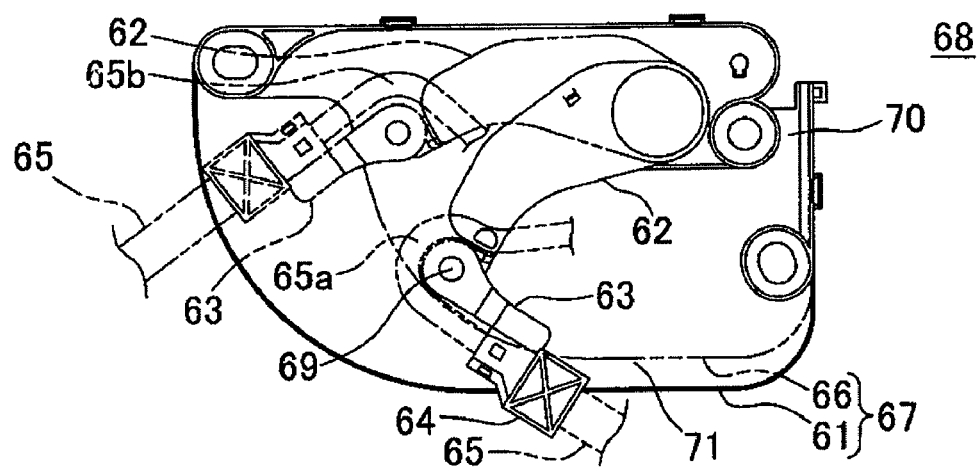
FIG. 6 is a front view showing one example of a related arm structure for power feeding.

FIGS. 4 and 5 show a second embodiment of an arm structure for power feeding according to the invention.

In a power feeding apparatus 26 including a second arm 17 similar to that of FIG. 3, a wire harness fixing portion 8, a first arm 5 and a protector 3 similar to those of the first embodiment as shown in FIG. 4, this structure is constructed so that a curved cantilevered (support) spring piece (guide portion) 27 is protruded and disposed in an arm longitudinal direction in an end (proximal end) 18 of the side of an axis portion 7 of the second arm 17 and an electric wire portion 14 of a wire harness 12 is bent in a large radius along the spring piece 27 (a bent part is shown by numeral 14a) as shown in FIG. 5. Description is omitted by assigning the same numerals to the same components as those of FIG. 1 or FIG. 3.

As shown in FIG. 5, the second arm 17 is formed in a convergent tapered shape like the first embodiment, but differs in that the axis portion 7 is had in the center of the proximal end 18, and is the same as that of FIG. 3. The second arm 17 has a flat substrate part 28 and a rib (peripheral wall) 29 orthogonal to the periphery of the substrate part 28, and the rib 29 has both tapered side surfaces 30, 31 and a curved surface (substitution of numeral 18) of a proximal end, and the wire harness fixing portion 8 is disposed integrally to one tapered side surface 30, and the curved spring piece 27 is protruded tangentially from one side surface 30 in the proximal end 18 of the second arm 17.

The spring piece 27 is constructed of a straight part 27a extending in an extension direction of one side surface 30 and a curved part 27b curved inward from the straight part 27a, and a radius R1 of an outer surface of the curved part 27b is set larger than a radius of an outer surface of the proximal end 18, and a top 27c of the curved part 27b protrudes long to the inside (by the other side surface 31) beyond the center of the axis portion 7, that is, a virtual centerline of the second arm 17. The spring piece 27 is preferably molded integrally to the second arm 17 by synthetic resin, but can also be formed separately by metal material to be fixed to the second arm 17 by caulking etc.

As shown in FIG. 5, the electric wire portion 14 of the wire harness 12 bends in a large radius in a folded-back direction along a curved surface of the outside of the spring piece 27 of the second arm 17 (a size of the curved surface is compared with a radius of the proximal end 18 of the example of FIG. 3). Consequently, as compared with the case (FIG. 3) where the spring piece 27 is not disposed in the second arm 17, bending stress of the electric wire portion 14 of the wire harness 12 is reduced and bending durability of the electric wire portion 14 improves. Also, the electric wire portion 14 is bent by a small force, so that a force of operating opening and closing of a slide door is reduced and operability of opening and closing improves.

As shown in FIG. 4, at the time of fully opening the slide door (slide structural body), the first arm 5 turns forward using an axis portion 4 as a fulcrum as shown by a chain line and is positioned obliquely forward and downward along an inclined front end wall 22 of the protector 3, and the second arm 17 turns forward larger than the first arm 5 and is positioned forward and downward slightly from the horizon, and the wire harness fixing portion 8 is positioned in the lower side of the second arm 17.

A corrugate tube portion 13 of the wire harness 12 is cabled substantially horizontally toward a wire harness fixing portion (not shown) of a vehicle body (a fixed structural body), and the electric wire portion 14 of the wire harness 12 extends straight along the lower surface (one side surface) 30 of the second arm 17 from the wire harness fixing portion 8 and bends smoothly in the large radius along the curved surface (substitution of numeral 27b) of the spring piece 27 of the second arm 17 (a bent part is shown by numeral 14b) and also is inclined backward and upward and continues to a wire harness insertion path 23 (a wire harness fixing portion 23a of the upper side) of a front end of the protector 3 through the back surface side of the first arm 5.

As the slide door is closed forward, the first arm 5 clockwise turns backward using the axis portion 4 as the fulcrum as shown by a solid line in a half opened state of the slide door and is positioned obliquely backward and downward in substantially a center position of the protector 3, and the second arm 17 clockwise turns backward slightly from the time of full opening using the axis portion 7 as a fulcrum and is positioned obliquely forward and downward, and the wire harness fixing portion 8 is positioned obliquely forward and downward in the top lower side of the second arm 17.

The electric wire portion 14 of the wire harness 12 extends straight along the lower surface (one side surface) 30 of the second arm 17 from the wire harness fixing portion 8 and bends smoothly in the large radius along the curved surface 27b of the spring piece 27 of the second arm 17 (the bent part is shown by numeral 14a) and is folded back forward and continues to the wire harness insertion path 23 of the protector front end across the back surface of the first arm 5. This state corresponds to a bend form of the wire harness 12 of FIG. 5 generally.

At the time of fully closing the slide door, the first arm 5 is positioned substantially horizontally along an upper end wall 24 of the protector 3, and the second arm 17 is positioned obliquely backward and downward, and the wire harness fixing portion 8 is positioned obliquely backward and downward in the top upper side of the second arm 17.

The electric wire portion 14 of the wire harness 12 extends straight along the upper side surface (one side surface) 30 of the second arm 17 from the wire harness fixing portion 8 and bends smoothly in the large radius along the curved surface 27b of the spring piece 27 of the second arm 17 (a bent part is shown by numeral 14c) and also is inclined forward and downward and continues to the wire harness insertion path 23 of the protector front end through the back surface of the first arm 5.

Action of each of the arms 5, 17 in the case of backward opening the slide door from the fully closed state only becomes opposite to action from the opened state to the closed state, and a bend form of the electric wire portion 14 of the wire harness 12 along the spring piece 27 of the second arm 17 is similar to the above.

The first arm 5 is urged upward (in a direction of absorbing looseness of the wire harness) by a spring member such as a torsion spring made of metal, but the spring member is eliminated and, for example, the wire harness 12 can also be led in the protector 3 by only rigidity (restoring force) of the corrugate tube 13. A form of the protector 3 can be set properly.

In addition, in the second embodiment, the cantilevered spring piece 27 is used, but a straddle mounted spring piece (not shown) can also be used. In this case, the top 27c of the spring piece 27 of FIG. 5 is extended in a curved shape and is joined to the other tapered side surface 31 of the second arm 17. Filling of space of the inside of this straddle mounted spring piece with resin material forms the proximal end 10 of the second arm 6 of FIG. 2 of the first embodiment.

By using the spring piece 27, a smaller amount of resin material than that of the case of FIG. 1 is required and also the electric wire portion 14 of the wire harness 12 is received elastically and a load imposed on the electric wire portion 14 is reduced. Also, when the electric wire portion 14 is received, the spring piece 27 flexes and the radius becomes larger and thereby, the wire harness 12 bends in the larger radius and bending stress is reduced.

Also, instead of fixing (integrating) a proximal end of the spring piece 27 to one side surface 30 of the second arm 17, for example, the proximal end can be fixed to the center of the curved surface of the proximal end 18 of the second arm 17 to be extended integrally to the straight part 27a through the curved part (not shown) of a quarter of a circular shape of the spring piece 27 from the proximal end.

Also, when the second arm 17 is straight (both side surfaces are parallel) rather than the convergent tapered shape, the curved spring piece 27 with a radius larger than a lateral width (plate width) of the straight second arm is protruded and formed from one side end of the end of the side of the axis portion 7 of the straight second arm (not shown).

Also, in each of the embodiments, the electric wire portion 14 of the wire harness 12 is received by the proximal end 10 or the spring piece 27 of the second arm 6, 17, but a flexible net tube (protective tube) made of synthetic resin of the wire harness 12 can be received. In this case, the electric wire 14 converges by the net tube and also is protected from abrasion etc. Also, instead of the corrugate tube 13, other protective tubes such as the net tube can be used or only the electric wire portion 14 can be bonded by tape winding or band fastening to be used as the wire harness.

Also, a form of the wire harness fixing portion 8 of the second arm 6, 17 can be set properly and, for example, in the case of only the electric wire 14 or the net tube, these wire harnesses can be fixed to a side part of the distal end side of the second arm 6, 17 by band fastening etc. Also, the first arm 5 is not straight and may be bent in, for example, a ˆ shape.

Also, the protector 3 is eliminated and the first arm 5 is directly supported to, for example, a slide door panel, and the wire harness 12 is not guided between the protector base 1 and the protector cover 2 but can be guided between, for example, the slide door panel and a door trim.

Also, in each of the embodiments, the case of installing the protector 3 in the slide door in the portrait state is described but, for example, the small protector 3 can be installed in the slide door in a landscape (horizontal) state or the protector 3 can be installed in the vehicle body side rather than the slide door in the portrait state or the landscape state.

An arm structure for power feeding according to the invention can be used for increasing bendability of a wire harness in a continuous power feeding apparatus installed in, for example, a slide door of an automobile or a slide door etc. of a vehicle etc. other than the automobile.

Here, the embodiments and the modifications are summarized as follows.

An arm structure includes a body, a first arm pivotally supported on the body, and a second arm pivotally supported on the first arm at an axis portion formed on a distal end side of the first arm. A wire harness fixing portion for fixing a wire harness is provided at a distal end side of the second arm. A guide portion having a curved face for guiding the wire harness is provided at an end portion at an end side of the second arm, the end side being opposite to the distal end side. A width of the guide portion is larger than a width of a portion of the second arm corresponding to the axis portion, in a width direction perpendicular to a longitudinal direction of the second arm.

By the configuration described above, the middle of a longitudinal direction of the wire harness is fixed to the wire harness fixing portion and by a push operation or a tensile operation of the longitudinal direction of the wire harness, the second arm turns using the axis portion as a fulcrum and also the first arm turns in the same direction as the second arm or a direction opposite to the second arm and the wire harness bends in the large radius without a fold etc. along the curved guide portion in the end of the axis portion side of the second arm and thereby, bending stress of the wire harness is reduced. In addition, the fact that "the wire harness bends in the large radius" means that the radius is larger than a bending radius of the wire harness in the case of no guide portion, and "the radius larger than that of the axis portion side" means that the radius is larger than a lateral width of the second arm in a position of the axis portion.

According to the above configuration, the wire harness is bent along the guide portion of the second arm in a radius larger than the case of no guide portion and thereby, bending stress of the wire harness can be reduced to increase bending durability and also a slide operation of a slide structural body for bending the wire harness can be performed smoothly by a small force.

The guide portion may be a proximal end portion extended from the portion of the second arm corresponding to the axis portion in the longitudinal direction of the second arm.

By the configuration described above, the wire harness bends smoothly in the large radius along the extended curved large-radius proximal end of the second arm. The extended proximal end may be integrally formed on the second arm.

According to the above configuration, the second arm is formed long by an extended dimension of the proximal end and thereby, the guide portion can be formed simply at low cost. Also, the extended proximal end is strong and is not damaged, so that cyclic bending reliability of the wire harness can be increased.

The guide portion may be comprised of an elastic member. Preferably, the guide portion is comprised of a spring member having a plate shape. Here, it is preferable that the spring member has a straight part and a curved part extended from the straight part, a curvature radius of the curved part is larger than that of the end portion at an end side of the second arm.

By the configuration described above, the wire harness bends smoothly in the large radius while being supported elastically by the spring piece. When the spring piece is pushed by the wire harness and flexes, the spring piece is deformed in the larger radius, so that the wire harness bends in the larger radius.

By the above configuration, the wire harness is supported elastically by the spring piece and a load imposed on a bent part of the wire harness can be reduced, so that the bending durability of the wire harness can be increased more. Also, the spring piece is flexibly deformed in the larger radius by the wire harness and thereby, the wire harness can be bent in the larger radius and the bending durability of the wire harness can be increased furthermore.

The second arm may be formed in a tapered shape so that a width of the second arm becomes gradually small from the axis portion side to the distal end side of the second arm, and the guide portion may be provided at extended lines from both side face of the second arm which form the tapered shape.

By the configuration described above, since the guide portion is positioned as the extension of the tapered side surface of the second arm and the proximal end side of the second arm is wider than the distal end side, the guide portion is inevitably constructed in the large radius and the guide portion smoothly extends along the tapered side surface, so that interference such as a catch etc. of the wire harness etc. on the guide portion does not occur.

By the above configuration, the large-radius guide portion can simply and surely be formed as the extension of the tapered side surface of the second arm and also the wire harness can be bent in the large radius smoothly without a catch etc. on the guide portion along the tapered side surface.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2009-210583 filed on Sep. 11, 2009, the contents of which are incorporated herein for reference.

What is claimed is:

1. An arm structure comprising
a first arm pivotally supported on a body; and
a second arm pivotally supported on the first arm at an axis portion formed on a distal end side of the first arm,
wherein a wire harness fixing portion for fixing a wire harness is provided at a distal end side of the second arm;
wherein a guide portion having a curved face for guiding the wire harness is provided at an end portion at an end side of the second arm, the end side being opposite to the distal end side; and
wherein a width of the guide portion is larger than a width of a portion of the second arm corresponding to the axis portion, in a width direction perpendicular to a longitudinal direction of the second arm.

2. The arm structure according to claim 1, wherein the guide portion is a proximal end portion extended from the portion of the second arm corresponding to the axis portion in the longitudinal direction of the second arm.

3. The arm structure according to claim 1, wherein the guide portion is comprised of an elastic member.

4. The arm structure according to 1, wherein the second arm is formed in a tapered shape so that a width of the second arm becomes gradually small from the axis portion side to the distal end side of the second arm; and
wherein the guide portion is provided at extended lines from both side face of the second arm which form the tapered shape.

5. The arm structure according to claim 3, wherein the guide portion is comprised of a spring member having a plate shape.

6. The arm structure according to claim 5, wherein the spring member has a straight part and a curved part extended from the straight part; and
wherein a curvature radius of the curved part is larger than that of the end portion at an end side of the second arm.

* * * * *